(12) United States Patent
Lenz

(10) Patent No.: US 9,719,607 B2
(45) Date of Patent: Aug. 1, 2017

(54) MAGNETIC HOLDING BRAKE AND ACTUATOR WITH A MAGNETIC HOLDING BRAKE

(75) Inventor: Norbert Lenz, Celle (DE)

(73) Assignee: Cameron International Corporation, Houston, TX (US)

(*) Notice: Subject to any disclaimer, the term of this patent is extended or adjusted under 35 U.S.C. 154(b) by 104 days.

(21) Appl. No.: 14/427,301

(22) PCT Filed: Sep. 10, 2012

(86) PCT No.: PCT/EP2012/003797
§ 371 (c)(1),
(2), (4) Date: May 13, 2015

(87) PCT Pub. No.: WO2014/037023
PCT Pub. Date: Mar. 13, 2014

(65) Prior Publication Data
US 2015/0300520 A1    Oct. 22, 2015

(51) Int. Cl.
| F16K 31/04 | (2006.01) |
| F16K 31/08 | (2006.01) |
| F16K 3/02 | (2006.01) |
| E21B 33/06 | (2006.01) |
| E21B 34/06 | (2006.01) |
| E21B 34/00 | (2006.01) |
| F16D 121/20 | (2012.01) |

(52) U.S. Cl.
CPC ............ *F16K 31/046* (2013.01); *E21B 33/06* (2013.01); *E21B 34/00* (2013.01); *E21B 34/066* (2013.01); *F16K 3/0254* (2013.01); *F16D 2121/20* (2013.01)

(58) Field of Classification Search
CPC ....... F16K 31/046; F16K 31/084; F16K 31/04
USPC .................................. 251/65, 129.11, 129.13
See application file for complete search history.

(56) References Cited

U.S. PATENT DOCUMENTS 3,593,238 A * 7/1971 Mori ....................... H01F 7/145
                                                          200/61.91
3,671,841 A * 6/1972 Hoffmann .............. H02K 37/10
                                                          310/181
(Continued)

FOREIGN PATENT DOCUMENTS

| FR | 1350034 A | 1/1964 |
| WO | 2006048616 A1 | 5/2006 |

OTHER PUBLICATIONS

PCT International Search Report; Application No. PCT/EP2012/003797; Dated Jun. 6, 2013; 4 pages.

*Primary Examiner* — Seth W Mackay-Smith
(74) *Attorney, Agent, or Firm* — Fletcher Yoder, P.C.

(57) ABSTRACT

A magnetic holding brake (1) having at least one turning brake member (4) allocatable to a rotatable part (2) of an actuator (3) and a fixed brake member (6) allocatable to a torque-proof part (5) of the actuator (3). The turning brake member (4) and the fixed brake member (6) each at least have one permanent magnet (7, 8) of different polarity. The permanent magnets are lying opposite to each other in a pre-defined relative position of the turning brake member (4) and the fixed brake member (6) under exertion of a braking or holding torque. In this manner, the possibility exists that a holding in the so-called "fail as is"-mode is more easily and reliably and at the same time cost-efficiently achievable without wear or further energy demand.

20 Claims, 2 Drawing Sheets

(56) References Cited

U.S. PATENT DOCUMENTS

| | | | | |
|---|---|---|---|---|
| 3,874,859 A * | 4/1975 | Krause | B01D 53/26 | 137/624.13 |
| 4,452,423 A * | 6/1984 | Beblavi | F16K 1/02 | 251/129.11 |
| 4,825,904 A * | 5/1989 | Grau | F16K 31/0682 | 137/554 |
| 4,948,091 A * | 8/1990 | Satoh | F16K 1/12 | 251/129.11 |
| 5,169,117 A * | 12/1992 | Huang | F16K 31/404 | 251/30.01 |
| 5,295,907 A * | 3/1994 | Akkerman | F16D 27/105 | 192/56.33 |
| 5,318,064 A * | 6/1994 | Reinicke | F16K 31/04 | 137/487.5 |
| 5,518,462 A * | 5/1996 | Yach | F16K 31/043 | 251/129.11 |
| 5,606,957 A * | 3/1997 | Feucht | F02M 26/67 | 123/568.23 |
| 5,647,321 A * | 7/1997 | Ichikawa | H02K 26/00 | 123/399 |
| 6,269,838 B1 * | 8/2001 | Woodworth | F15B 13/0406 | 137/625.22 |
| 6,512,318 B2 * | 1/2003 | Torok | H02K 1/246 | 310/181 |
| 6,997,430 B2 * | 2/2006 | Denning | F16K 31/047 | 251/129.11 |
| 7,284,571 B2 * | 10/2007 | Ozawa | F16K 31/042 | 137/625.46 |
| 8,006,952 B2 * | 8/2011 | Wygnanski | E21B 34/066 | 251/129.11 |
| 8,274,245 B2 * | 9/2012 | Biester | F16H 25/2454 | 137/81.1 |
| 8,297,315 B2 * | 10/2012 | Esveldt | F16K 1/12 | 137/625.3 |
| 2001/0022350 A1 * | 9/2001 | Ito | A61M 27/006 | 251/65 |
| 2003/0189385 A1 * | 10/2003 | Fujita | H02K 23/04 | 310/181 |
| 2004/0212260 A1 * | 10/2004 | Aoki | F16K 31/041 | 310/68 A |
| 2005/0029476 A1 * | 2/2005 | Biester | E21B 33/0355 | 251/58 |
| 2005/0150558 A1 | 7/2005 | Ozawa et al. | | |
| 2007/0296312 A1 * | 12/2007 | Yasuda | H02K 37/20 | 310/12.24 |
| 2011/0076136 A1 * | 3/2011 | Small | F04D 25/026 | 415/124.2 |
| 2011/0181141 A1 * | 7/2011 | Biester | H02K 49/106 | 310/154.02 |
| 2015/0048266 A1 * | 2/2015 | Shen | F16K 31/02 | 251/69 |

\* cited by examiner

MAGNETIC HOLDING BRAKE AND ACTUATOR WITH A MAGNETIC HOLDING BRAKE

CROSS-REFERENCE TO RELATED APPLICATION

This National Stage Application claims priority to and benefit of PCT Application No. PCT/EP2012/003797, entitled "Magnetic Holding Brake and Actuator with a Magnetic Holding Brake", filed on Sep. 10, 2012, which is herein incorporated by reference in its entirety.

BACKGROUND

The invention relates to a magnetic holding brake, which is especially employed for the actuation of valves in the oil and natural gas industry. Examples of such valves include gate valves, chokes, ball valves, blow-out-preventers (BOP) or other similar devices.

Each of these valves has at least one valve member, which is adjustable into an opened and a closed position. The respective valve member is adjusted between the opened and the closed position by an adjusting part of the actuator. An electric motor of the actuator adjusts the adjusting part of the actuator via a corresponding drive shaft or motor shaft.

In the field of the oil and natural gas industry, valves are required to fulfill certain safety requirements, which may require that the electrically actuated valves maintain a certain position of the valve member during an energy failure.

One safety mode is called "fail safe close" or "fail safe open" and another safety mode is called "fail as is". In the "fail safe close/open"-mode, the respective valve member of the valve is automatically driven to the closed or opened position during an energy failure. In the "fail as is"-mode, corresponding valve members of the valve remain in their currently assumed position during an energy failure.

In the "fail as is"-mode it is further to be considered that the valve member should be held in the opened or actuated position without the use of energy if possible.

BRIEF DESCRIPTION OF THE DRAWINGS

In the following, an advantageous embodiment of the invention is explained in detail with reference to the figures attached in the drawing.

In the figures.

DETAILED DESCRIPTION

Figure 1:
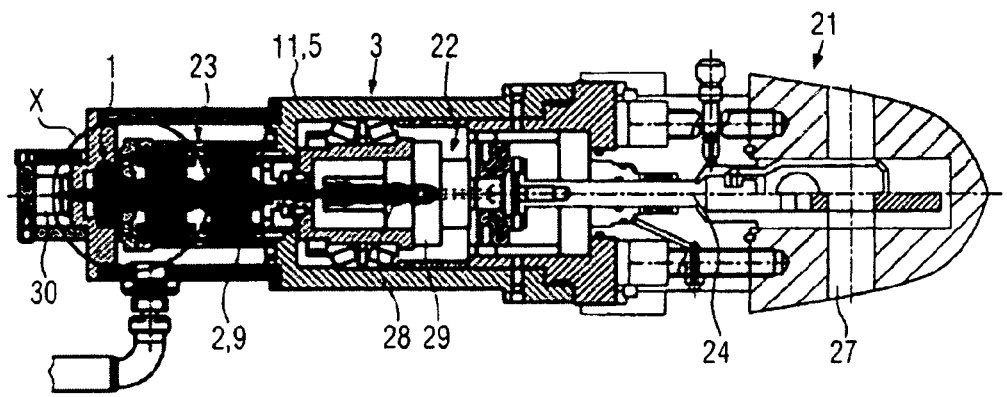
FIG. 1: shows a longitudinal section through an actuator with an associated valve.

The object underlying the invention is to enable such holding in the "fail as is"-mode in a more simple and reliable and at the same time cost-efficient way without further energy demands and free from wear.

This object is solved by the features of patent claim 1.

The magnetic holding brake according to the invention has at least one turning brake member and a fixed brake member. The turning brake member is coupled to a rotatable part of an actuator. The fixed brake member is accordingly coupled to a torque-proof part of the actuator. The turning brake member and the fixed brake member each have at least one permanent magnet, wherein the permanent magnets of the turning brake member and the fixed brake member have different polarities. In a certain relative position of turning brake member and fixed brake member, the respective permanent magnets lie opposite to each other while exerting a braking or holding torque.

A simple and reliable construction results from the utilization of the turning brake member and the fixed brake member. Due to the attractive force of the permanent magnets of the turning brake member and the fixed brake member, each having a different polarity, a force results sufficient to maintain the holding torque or the adjusted position in the "fail as is"-mode, respectively. An energy demand is not necessary for this holding torque. Due to the respective permanent magnets of the turning brake member and the fixed brake member not coming into contact with each other, the magnetic holding brake according to the present invention is free of wear. At the same time, it is cost-efficient, reliable and compact in terms of its construction.

In some embodiments, for example, two or more turning brake members are assigned to one fixed brake member or vice versa, each having corresponding permanent magnets. Besides that, a same number of two or more turning brake members or fixed brake members may be used for the magnetic holding brake. It is also possible that the turning brake member of the magnetic holding brake is a moving brake part which is coupled to the corresponding moving part of the actuator. Such a moved part of the actuator may be an adjusting part, which is displaceable in the longitudinal direction. In this case, the respective moving brake part would extend over a certain length of the moving part of the actuator and would be moveable together certain length of the moving part of the actuator and would be moveable together therewith. The coupling of the fixed brake member would be analogous to the embodiments above.

However, in the actuators, rotatable parts are often employed, such that a turning brake member of the magnetic holding brake becomes effective, respectively, wherein for example the turning brake member may be designed to be in turning association with a drive shaft or motor shaft as rotatable part of the actuator. This means that the rotor of the magnetic holding brake rotates together with the draft shaft or the motor shaft of the actuator and in the "fail as is"-mode, the magnetic holding brake would hold the drive shaft or motor shaft in the defined turning position during energy failure.

In this respect, it may further be regarded as advantageous if the fixed brake member is designed to be located at a stationary part, especially as a stator arranged at the housing of the actuator. This stator may for example at least sectionwise extend along the rotor, such that the respective permanent magnets are aligned opposite to each other in a certain relative position under exertion of the braking or holding torque. In order to be able to arrange the rotor at the drive shaft or motor shaft in a simple manner, it may be designed as a rotor ring. The rotor ring may be easily plugged onto the drive shaft or motor shaft and may be attachable thereto.

In order to be able to arrange the permanent magnet easily, at a rotor, the permanent magnet may be arranged in the rotor ring or on the outer side of the ring.

In order to be able to for example entirely enclose the rotor ring, the stator may be designed as a stator ring surrounding or encompassing the rotor ring.

Also with the stator, the possibility exists that the permanent magnet is arranged within the stator ring or the inner side of the stator ring. Due to the arrangement of the permanent magnet on the outer side of the rotor ring and the inner side of the stator ring, as well as the corresponding relative arrangement of stator ring and rotor ring, the permanent magnets may be arranged relatively close to each other for exerting the respective magnetic force.

In order to exert a higher braking torque or holding torque, as the case may be, two or more rotor and/or stator permanent magnets may be each arranged with a changing or alternating polarity. This means that for example on the outer side of the rotor, two or more permanent magnets are arranged, each having a different polarity. Analogously, this applies for the inner side of the stator ring.

For a safe and robust arrangement of the permanent magnets, rotor and/or stator permanent magnets may be at least partly arranged within recesses at the respective outer side of the ring and inner side of the ring, respectively.

In this respect, further the possibility exists that the ring permanent magnets and/or the stator permanent magnets are held laterally in axial direction of the respective drive shaft. This may affect at least the parts of the permanent magnet protruding from the respective recess. Analogously, such a position may be utilized just when the respective permanent magnets are applied on the corresponding outer sides or inner sides, respectively.

Due to the permanent magnets being provided with changing polarity, respectively, it may prove advantageous if the rotor and/or stator permanent magnets are arranged at a distance from each in circumferential direction at the rotor or the stator, respectively.

A good arrangement of the respective permanent magnets with a sufficient magnetic force occurring between them, may result for example if the rotor permanent magnets and the stator permanent magnets each extend over the same centre angle in circumferential direction. This means that for example the permanent magnets on the inner side of the stator extend over a centre angle of 60° in circumferential direction, such that for example six of these permanent magnets may be arranged next to each with a changing polarity. If a corresponding distance between neighbouring permanent magnets should be provided, then a smaller centre angle may be at hand with six permanent magnets for example.

The permanent magnets may be designed correspondingly small, if they are manufactured from a corresponding material, such as neodym-iron-bor.

As explained above, actuators are employed in the field of the oil and natural gas industry for operating valves. Such an actuator usually has one or more electric motors which adjust an adjusting part by means of a drive shaft or motor shaft, respectively. Thereby, usually a movement conversion is carried out from the turning movement of the drive/motor shaft into a linear movement of the adjusting part. This may be carried out for example through a screw drive or alike. The adjusting part is connected to a valve member in a movable connection in order to adjust it between an opened and a closed position. According to the present invention, the actuator has at least one magnetic holding brake of the kind described above.

As already explained above, the respective rotor ring could be arranged on the drive shaft or motor shaft, respectively, while the stator ring would be assigned to a corresponding housing part of the actuator.

Coupling the stator ring to the housing part may be carried out for example by screwing together the stator with the respective housing part. In a corresponding rest position or braking position, the north and south poles of the rotor and stator permanent magnets are opposing each other respectively, and thereby generate the braking or holding torque through the magnetic field. This holding torque is also to be considered during the start-up of the motor of the actuator, so that it is to be deemed advantageous if the electric motor of the actuator at least during the start-up has a start-up torque which exceeds the holding torque exerted by the magnetic holding brake.

This means that during start-up of the motor or during an initial adjustment of the valve, respectively, not only a sufficient force for valve adjustment but also for exceeding the maximum, holding torque of the magnetic holding brake is applied. Overcoming the holding torque of the magnetic holding brake generates heat.

In order to dissipate such generated heat in a simple manner, especially when actuators are arranged at the bottom of the sea with corresponding valves, the magnetic holding brake may be arranged within or at least adjacent to a wall of the housing of the actuator. Thereby, the generated heat may be easily dissipated directly to the sea water.

If the respective end position is reached during the adjustment of the valve, the electric motor switches off and the magnetic holding brake takes over the holding function. In this respect, it is to be considered that the various parts of the actuator and the valve generate friction torques, such that the respective holding torque of the magnetic holding brake may always be smaller than the actuating torque (e.g., torque required to overcome the friction torques generated between various parts of the actuator and the valve) for these parts.

With valves in the oil and natural gas industry, it is further to be considered that high pressures are at hand. These pressures act against an adjustment direction during the adjustment of the valves for example when opening the valve. However, these pressures act in a supporting manner during a respectively reversed movement direction of the valve, for example closing the valve (alternately, the pressures may act against an adjustment direction of the valve when closing the valve, and may act in a supporting manner when opening the valve). For an adjustment where the pressures act in a supporting manner, usually no power of the actuator is required. In some cases there even might be the necessity that the actuator with its electric motor has to act in a slowing down manner.

In order to take this different relation of forces into account during the adjustment of the valve, according to the present invention, a free wheel may be designed between the drive shaft and the rotor of the magnetic holding brake in a shaft turning direction.

For example, a free wheel between the rotor and the driving shaft has the effect that, during the opening actuation of the valve, the magnetic holding brake is not overturned and thereby also no additional torque of the motor is to be overcome. A torque is transmitted by a free wheel only in one direction. In the open position, the magnetic holding brake takes over the respective holding function, as described above. During the closing of the valve, the maximum braking torque of the magnetic holding brake is exceeded and the magnetic holding brake is overturned. Thereby, the motor may easily exceed the respective torque of the magnetic holding brake, because during such an adjustment, only little power is demanded from the valve. This is not necessary if a free wheel is implemented.

Furthermore, due to the utilization of the free wheel, no stronger electric motor is required for the respective actuator in comparison with an actuator without magnetic holding brake.

FIG. 1 shows a longitudinal section through an actuator 3 with a magnetic holding brake 1 according to the invention. The actuator 3 is coupled to a valve 21 which may be for example a gate valve, choke, ball valve, blow-out-preventer or alike. Such a valve 21 serves for opening and closing a corresponding duct 27 for flowing oil or gas. The valve 21 therefore has a valve member 24 in the form of a slider. The valve member 24 is adjustable between an opened and a closed position. The valve member 24 is adjustable by the actuator 3. The actuator 3 has at least one electric motor 23, which in the illustrated embodiment comprises a rotor and a stator. A rotatable part 2 in the form of a drive shaft or motor shaft 9 is rotatable by the rotor. The rotation of the shaft is convertible into a linear movement by a movement conversion in the form of threaded spindle 28/threaded nut 29. The corresponding shaft 9 is, as the case may be, in turning association with the threaded spindle 28 via a gear device. The threaded spindle 28 is linearly adjusted within the actuator 3 at a corresponding rotation of the threaded nut 29. An adjustment part 22 is connected to the threaded nut 25, wherein the linear movement of the adjustment part 22 is transferable to the valve member 24.

Figure 2:
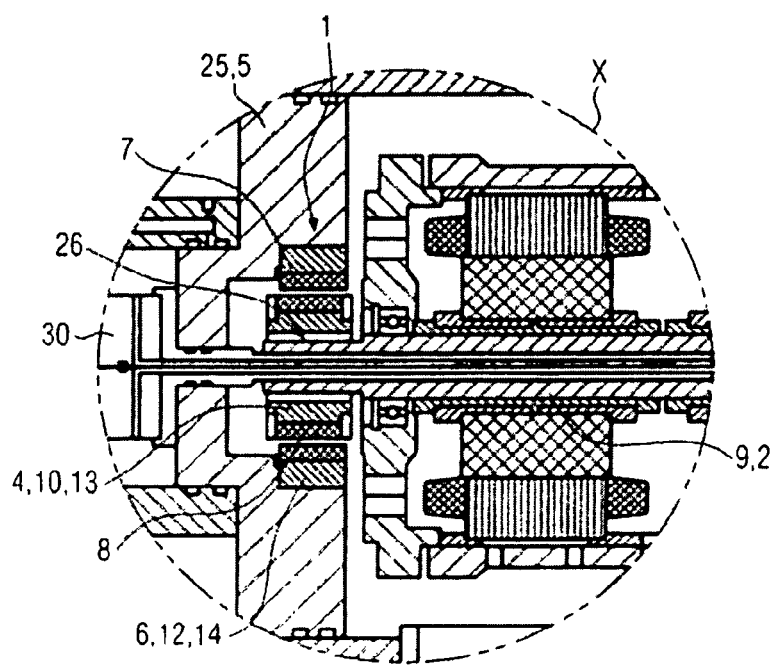
FIG. 2: shows a magnified illustration of a detail "X" from FIG. 1.

The actuator 3 has a housing 11 with a housing wall 25, especially illustrated in FIG. 2.

The drive shaft or motor shaft 9 extends to a position sensor 30 and especially at least to within the housing wall 25. There, the magnetic holding brake 1 according to the invention is arranged. This comprises a turning brake member 4 and fixed brake member 6. The turning brake member 4 is coupled to the rotatable part 2 of the actuator 3, that means to the drive shaft or motor shaft 9. The fixed brake member 6 is assigned to torque-proof part 5 of the actuator 3, that means in the present case to the housing wall 25 of the housing 11. Both brake members are each detachably affixed to the respective part of the actuator.

Figure 3:
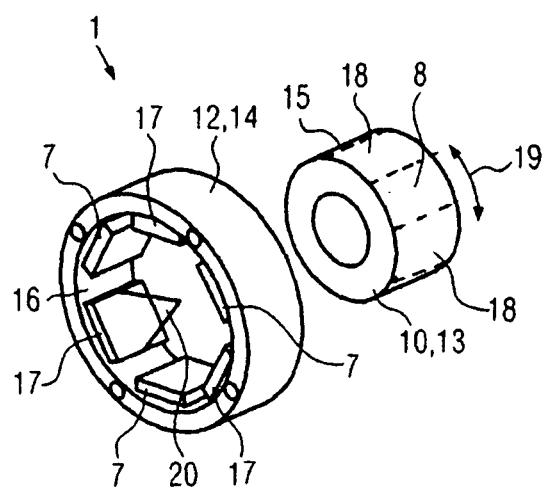
FIG. 3: shows a magnetic holding brake according to the present invention in an isolated illustration.

The fixed brake member 6 and the turning brake member 4 have on their sides facing each other a number or row of permanent magnets 7, 8, 17, 18, see also FIG. 3. These are arranged at the respective part in the circumferential direction 19 and at least arranged distanced from each other at or near the fixed brake member 6. In particular the permanent magnets 7, 17 and 8, 18 of alternating polarities are arranged next to each other.

According to FIG. 2, it is further visible that between the drive/motor shaft 9 and the turning brake member 4, a free wheel 26 is formed. This has the effect that with at least one rotational direction of the drive/motor shaft, the turning brake member 4 is not rotated and thereby also no corresponding torque of the electric motor is to be overcome.

According to the respective embodiment, the permanent magnets 7, 17 or 8, 18 are arranged in respective recesses on the inner and outer sides, respectively, of the respective brake member and, as the case may be, laterally supported.

In FIG. 3, the magnetic holding brake 1 is illustrated separately without further members. The turning brake member 4 (see FIG. 2) is designed as a rotor 10 or rotor ring 13, respectively. The respective rotor ring 13 has an inner hole or bore, within which the drive/motor shaft 9 is arrangeable with a corresponding free wheel 26. On the outer side 15 of the ring, the rotor ring 13 of the illustrated embodiment has six permanent magnets 8, 18. The magnets 8, 18 are arranged with alternating polarity in the circumferential direction 19. During installation of the magnetic holding brake 1, the rotor ring 13 is arranged within a stator ring 14, see also FIG. 2. The stator ring 14, such as a stator 12, is firmly or permanently connected to the corresponding housing 11 or a wall 25 of the housing 11, respectively. On an inner side 16 of the ring, a corresponding number of permanent magnets 7, 17 are also arranged with alternating polarity in the circumferential direction 19. The arrangement may, in an exemplary embodiment, also be such that each of the permanent magnets 7, 17 or 8, 18, respectively, extends over the same centre angle 20 in the circumferential direction 19. However, such an arrangement is not implemented within the embodiment according to FIG. 3, in which the permanent magnets of the rotor ring 13 are arranged adjacent or directly next to each other, while they are arranged at a distance from each other at the stator ring 14.

The magnetic holding brake according to the present invention, as a matter of course, is not only employable for the illustrated valve according to FIGS. 1 and 2. This is only exemplarily described, whereby in this case the valve is a gate valve or valve with a slider. An analogous arrangement of the magnetic holding brake according to the present invention is also possible for other valves.

Due to the magnetic holding brake, it is possible to maintain an opened or adjusted position in the "fail as is"-mode of the valve in an easy manner.

The invention claimed is:

1. A magnetic holding brake comprising:
   at least one turning brake member that is coupled to a rotatable part of an actuator;
   a fixed brake member that is coupled to a torque-proof part of the actuator; and
   a free wheel positioned within a bore of the turning brake member and radially between the rotatable part and the turning brake member, wherein the free wheel is configured to block rotation of the turning brake member in one rotational direction;
   wherein each of the turning brake member and the fixed brake member comprise a permanent magnet, the permanent magnet of the fixed brake member having a different polarity than the permanent magnet of the turning brake member;
   wherein the permanent magnet of the fixed brake member and the permanent magnet of the turning brake member extend across the same center angle in the circumferential direction; and
   wherein, in a pre-defined relative position of the turning brake member and the fixed brake member, the permanent magnet of the fixed brake member and the permanent magnet of the turning brake member are radially aligned under exertion of a braking or holding torque.

2. The magnetic holding brake according to claim 1, wherein the turning brake member comprises a rotor and the rotatable part of the actuator comprises a drive shaft, wherein the rotor is in turning association with the drive shaft.

3. The magnetic holding brake according to claim 2, wherein the rotor comprises a rotor ring.

4. The magnetic holding brake according to claim 3, wherein the permanent magnet of the rotor is arranged within the rotor ring or on the outer side of the rotor ring.

5. The magnetic holding brake according to claim 1, wherein the fixed brake member comprises a stator coupled to a housing of the actuator.

6. The magnetic holding brake according to claim 5, wherein the stator comprises a stator ring surrounding the turning brake member.

7. The magnetic holding brake according to claim 6, wherein the permanent magnet of the stator is arranged within the stator ring or at the inner side of the stator ring.

8. The magnetic holding brake according to claim 1, wherein each of the turning brake member and the fixed brake member comprise a plurality of permanent magnets, and wherein the permanent magnets of the turning brake member are arranged with circumferentially alternating polarities and the permanent magnets of the fixed brake member are arranged with circumferentially alternating polarities.

9. The magnetic holding brake according to claim 8, wherein the permanent magnets of the turning brake member are arranged at a distance from each other in the circumferential direction.

10. The magnetic holding brake according to claim 1, wherein the permanent magnet of the turning brake member is at least partially inserted into a recess on the outer side of the turning brake member or the permanent magnet of the fixed brake member is at least partially inserted into a recess on the inner side of the fixed brake member.

11. The magnetic holding brake according to claim 1, wherein the permanent magnet of the fixed brake member and the permanent magnet of the turning brake member are laterally held in axial relation to a drive shaft.

12. An actuator for adjusting a valve in the oil and natural gas industry, comprising:
    an adjusting part that is adjustable by an electric motor via a drive shaft;
    at least one turning brake member that is coupled to the drive shaft;
    a fixed brake member that is coupled to a torque-proof part of the actuator; and
    a free wheel positioned between the drive shaft and the turning brake member, wherein the free wheel is configured to transmit torque from the drive shaft to the turning brake member in only one rotational direction;
    wherein each of the turning brake member and the fixed brake member comprise a permanent magnet, the permanent magnet of the fixed brake member having a different polarity than the permanent magnet of the turning brake member;
    wherein, in a pre-defined relative position of the turning brake member and the fixed brake member, the permanent magnet of the fixed brake member and the permanent magnet of the turning brake member are radially aligned under exertion of a braking or holding torque; and
    wherein adjustment of the adjusting part adjusts a valve member between an opened position and a closed position.

13. The actuator according to claim 12, wherein the electric motor, at least during start-up, has a start-up torque exceeding a holding torque exerted by the permanent magnets.

14. The actuator according to claim 12, wherein the fixed brake member and the torque-proof part are arranged in or next to a housing wall.

15. The actuator of claim 12, wherein the free wheel is positioned within a bore of the turning brake member and radially between the drive shaft and the turning brake member.

16. The actuator of claim 12, wherein the permanent magnet of the fixed brake member and the permanent magnet of the turning brake member each extend over a same center angle in a circumferential direction.

17. An actuator configured to adjust a valve, comprising:
    a magnetic holding brake, comprising:
        a turning brake member configured to be coupled to a drive shaft of the actuator;
        a fixed brake member configured to be supported within a wall of a housing of the actuator; and
    at least one motor configured to drive the drive shaft to adjust the valve, wherein the magnetic holding brake is positioned on a first side of each motor of the actuator and the valve is positioned on a second side of each motor of the actuator along a longitudinal axis of the drive shaft;
    wherein the turning brake member comprises a first permanent magnet and the fixed brake member comprises a second permanent magnet, and the first permanent magnet of the turning brake member and the second permanent magnet of the fixed brake member are configured to exert a braking torque to block rotation of the turning brake member and the rotatable part relative to the fixed brake member and the housing when the first permanent magnet and the second permanent magnet are aligned with one another in a radial direction.

18. The actuator of claim 17, comprising a free wheel configured to be positioned radially between the drive shaft and the turning brake member, wherein the free wheel is configured to block rotation of the turning brake member in one rotational direction.

19. The actuator of claim 18, wherein the first permanent magnet and the second permanent magnet each extend over a same center angle in a circumferential direction.

20. The actuator of claim 17, wherein the magnetic turning brake does not overlap a respective rotor of any motor of the actuator along the longitudinal axis.

* * * * *